(12) United States Patent
Hosoya et al.

(10) Patent No.: US 8,373,774 B2
(45) Date of Patent: Feb. 12, 2013

(54) IMAGE PICKUP APPARATUS HAVING OPTICAL PATH REFLECTING ZOOM LENS

(75) Inventors: Takeshi Hosoya, Machida (JP); Masahito Watanabe, Hachioji (JP); Tomoyuki Satori, Yokohama (JP); Eiji Shirota, Hino (JP)

(73) Assignee: Olympus Imaging Corp., Tokyo (JP)

( * ) Notice: Subject to any disclaimer, the term of this patent is extended or adjusted under 35 U.S.C. 154(b) by 55 days.

(21) Appl. No.: 12/928,414

(22) Filed: Dec. 9, 2010

(65) Prior Publication Data

US 2011/0157430 A1 Jun. 30, 2011

(30) Foreign Application Priority Data

Dec. 28, 2009 (JP) .................................. 2009-298816

(51) Int. Cl.
*H04N 5/262* (2006.01)
*G02B 15/14* (2006.01)
*G02B 3/00* (2006.01)
*G02B 17/00* (2006.01)
*G02B 5/04* (2006.01)

(52) U.S. Cl. ...................... 348/240.3; 359/676; 359/691; 359/737; 359/837

(58) Field of Classification Search ............... 348/240.3; 359/676, 691, 737, 837
See application file for complete search history.

(56) References Cited

U.S. PATENT DOCUMENTS

| | | | |
|---|---|---|---|
| 6,771,432 B2 | 8/2004 | Mihara | |
| 7,113,345 B2 | 9/2006 | Mihara et al. | |
| 7,466,500 B2 | 12/2008 | Souma et al. | |
| 7,561,343 B2 | 7/2009 | Hankawa et al. | |
| 7,619,832 B2* | 11/2009 | Nishio | 359/691 |
| 7,626,766 B2* | 12/2009 | Yoshitsugu et al. | 359/683 |
| 2004/0190154 A1* | 9/2004 | Wakai et al. | 359/676 |
| 2004/0201902 A1* | 10/2004 | Mihara et al. | 359/676 |
| 2006/0158742 A1* | 7/2006 | Mihara | 359/676 |
| 2006/0285221 A1* | 12/2006 | Bito et al. | 359/676 |
| 2007/0139786 A1* | 6/2007 | Iwasawa | 359/676 |
| 2008/0192361 A1* | 8/2008 | Mihara | 359/691 |
| 2008/0218874 A1* | 9/2008 | Take | 359/676 |
| 2008/0239506 A1* | 10/2008 | Ori | 359/676 |
| 2008/0266672 A1* | 10/2008 | Mihara | 359/676 |
| 2008/0291543 A1* | 11/2008 | Nomura et al. | 359/676 |
| 2012/0008214 A1* | 1/2012 | Toyoda et al. | 359/686 |

FOREIGN PATENT DOCUMENTS

JP 2008-096559 4/2008

* cited by examiner

*Primary Examiner* — Aung S Moe
*Assistant Examiner* — Chia-Wei A Chen
(74) *Attorney, Agent, or Firm* — Kenyon & Kenyon LLP

(57) ABSTRACT

An image pickup apparatus includes a zoom lens, and an image pickup element having an image pickup surface which receives optically an image formed by the zoom lens, and which converts the image received to an electric signal. The image pickup apparatus satisfies the following conditional expressions (1) Lv 1 Er/Lv 1 EL<0.49, (2) 0.93<Lv 1 Ef/IHs, and (3) Lv 1 Ef/Lv 1 Er<0.99.

17 Claims, 14 Drawing Sheets

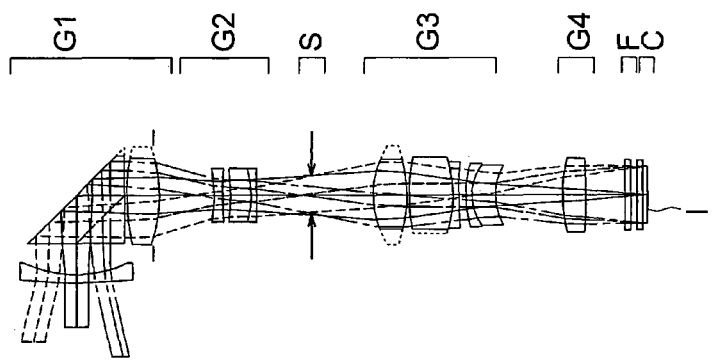
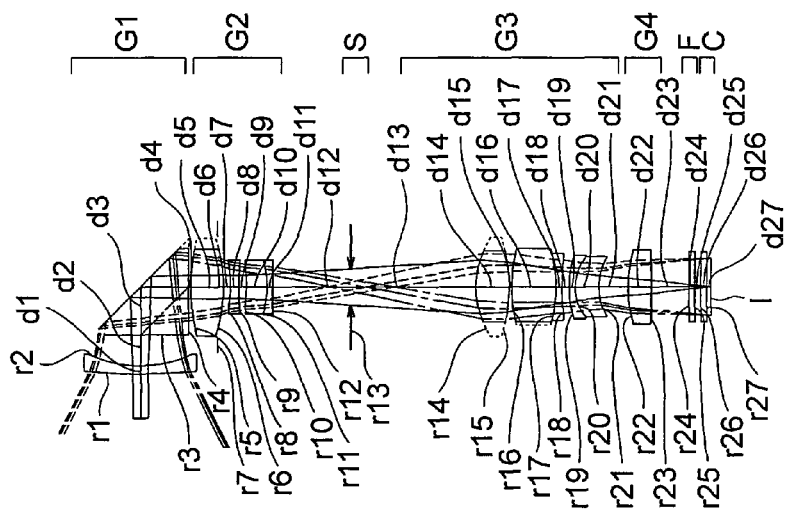
FIG. 1A
FIG. 1B

FIG. 3A
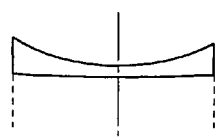
FIG. 3B    FIG. 3C    FIG. 3D
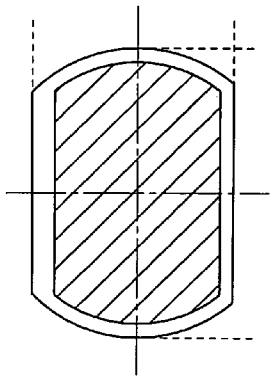  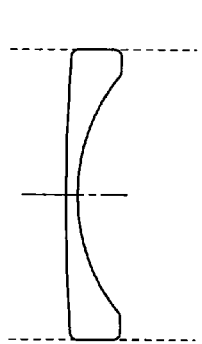  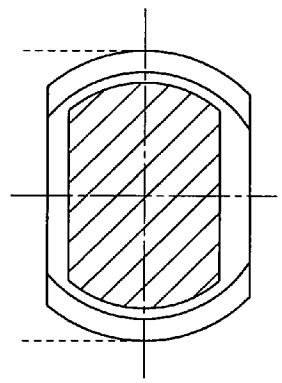

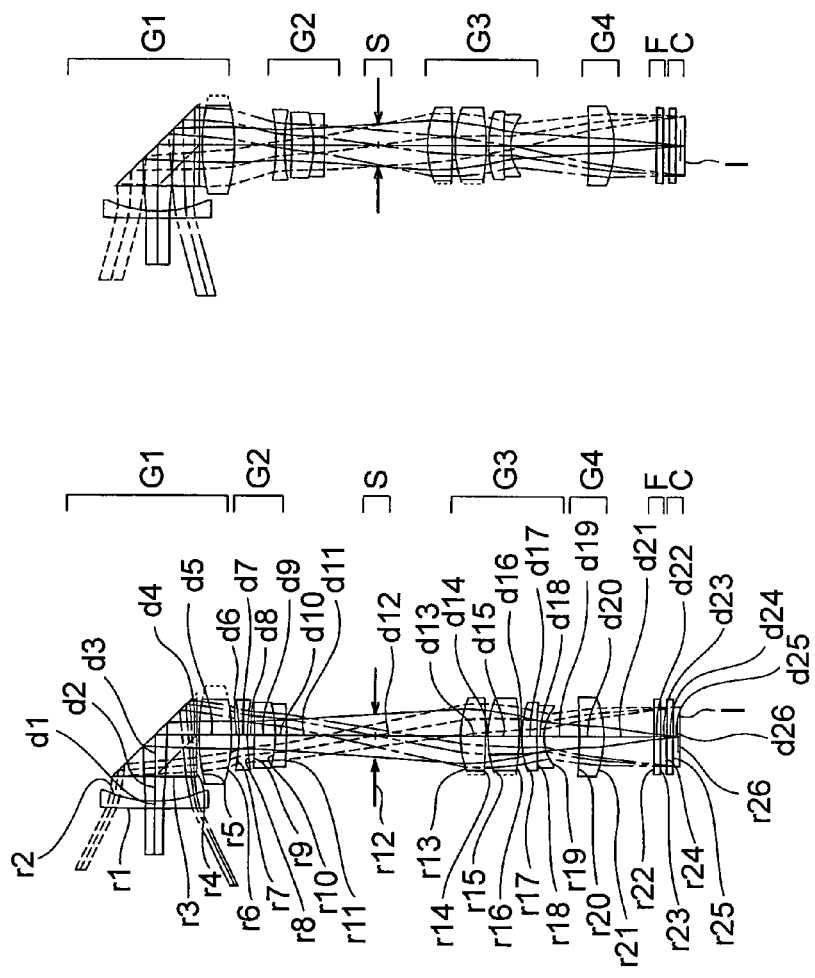
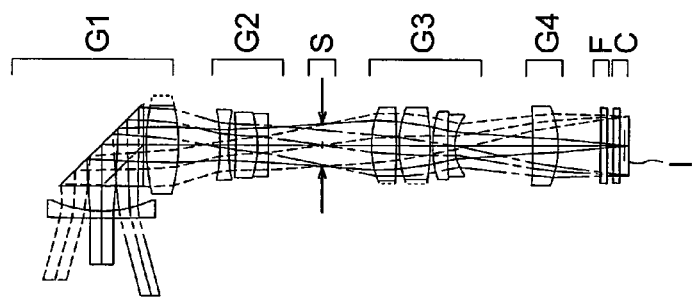

IMAGE PICKUP APPARATUS HAVING OPTICAL PATH REFLECTING ZOOM LENS

CROSS-REFERENCE TO RELATED APPLICATION

The present application is based upon and claims the benefit of priority from the prior Japanese Patent Application No. 2009-298816 filed on Dec. 28, 2009; the entire contents of which are incorporated herein by reference.

BACKGROUND OF THE INVENTION

1. Field of the Invention

The present invention relates to an image pickup apparatus having an optical path reflecting zoom lens.

2. Description of the Related Art

For instance, a zoom lens which includes an object-side lens unit having a reflecting surface and a lens unit which moves in an optical axial direction at the time of zooming from a wide angle end to a telephoto end on an image side of the object-side lens unit, are disposed has been disclosed in Japanese Patent Application Laid-open Publication No. 2008-96559.

Furthermore, an image pickup apparatus in which an opening portion of an aperture stop is made to be elliptical and a shape of a lens after reflecting (reflection) is ovalized for having both thinning of a zoom lens and reduction of ghost image has been disclosed in Japanese Patent Application Laid-open Publication No. 2008-96559.

SUMMARY OF THE INVENTION

According to the present invention, there is provided an image pickup apparatus including a zoom lens, and an image pickup element having an image pickup surface which receives optically an image formed by the zoom lens, and which converts the image received to an electric signal, and the zoom lens includes an object-side lens unit including a prism having a reflecting surface which reflects an optical path, and an object-side sub lens unit having a negative refracting power which is disposed on an object side of the prism, an aperture stop which is disposed on an image side of the object-side lens unit, and which restricts an axial light beam, and a first zooming lens unit having a positive refracting power, which is disposed on the image side of the aperture stop, and which is moved to be closer to the aperture stop at a telephoto end rather than the wide angle end for carrying out zooming, and the object-side lens unit is at a position which is fixed at the time of zooming from the wide angle end to the telephoto end, and is a lens unit which is disposed nearest to the object side, and when a surface including an incident-light axis of light which is incident on the reflecting surface, and a reflected-light axis of light which is reflected at the reflecting surface is let to be a reference surface, and a side at which the incident-light axis is with respect to the reflected-light axis is let to be a front side (i.e. object side), and a side opposite to the front side with respect to an optical axis of light after reflection is let to be a rear side (i.e. side opposite to the object side, or in other words, monitor side), the image pickup element has an effective image pickup area having a rectangular shape with a short side and a long side, and the short side of the effective image pickup area is parallel to the reference surface, and the first zooming lens unit includes an object-side lens which is disposed nearest to the aperture stop in the first zooming lens unit, and the object-side lens in the first zooming lens unit has a noncircular outer shape with a part of the front side and the rear side cut out, and in the object-side lens in the first zooming lens unit, an outer size in a direction from the optical axis to the front side is smaller than an outer side in a direction from the optical axis to the rear side, and the object-side lens in the first zooming lens unit has an object-side lens surface which satisfies the following conditional expressions (1), (2), and (3).

$$Lv1Er/Lv1EL<0.49 \quad (1)$$

$$0.93<Lv1Ef/IHs \quad (2)$$

$$Lv1Ef/Lv1Er<0.99 \quad (3)$$

where,

Lv 1 Er denotes a length of an area of the rear side measured from the optical axis along the reference surface, in an effective area of the object-side lens surface of the object-side lens in the first zooming lens unit, Lv 1 EL denotes a length of an area measured along a direction perpendicular to the reference surface including the optical axis, in the effective area of the object-side lens surface of the object-side lens in the first zooming lens unit, Lv 1 Ef denotes a length of an area of the front side measured from the optical axis along the reference surface, in the effective area of the object-side lens surface of the object-side lens in the first zooming lens unit, and IHs denotes the maximum image height in a direction along the reference surface in the effective image pickup area.

BRIEF DESCRIPTION OF THE DRAWINGS

FIG. 1A is a cross-sectional view with an optical path at a wide angle end of a zoom lens in an image pickup apparatus of a first embodiment, and FIG. 1B is a cross-sectional view with an optical path at an intermediate focal length state of the zoom lens in the image pickup apparatus of the first embodiment;

FIG. 3A, FIG. 3B, FIG. 3C and FIG. 3D are diagrams showing an effective area and a shape of an object-side sub lens unit in a first lens unit (object-side lens unit) of the zoom lens in the image pickup apparatus of the first embodiment;

FIG. 10A is a cross-sectional view with an optical path at a wide angle end of a zoom lens in an image pickup apparatus of a third embodiment, and FIG. 10B is a cross-sectional view with an optical path at an intermediate focal length state of the zoom lens in the image pickup apparatus of the third embodiment;

DETAILED DESCRIPTION OF THE PREFERRED EMBODIMENTS

Figure 2:
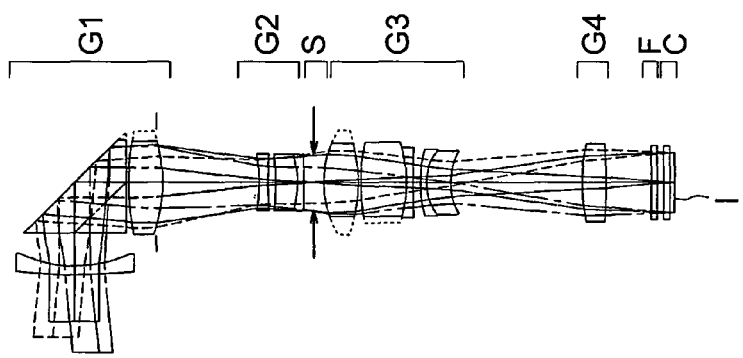
FIG. 2 is a cross-sectional view with an optical path at a telephoto end of the zoom lens in the image pickup apparatus of the first embodiment.

The present invention provides an image pickup apparatus including a zoom lens, and an image pickup element having an image pickup surface which receives optically an image formed by the zoom lens, and which converts the image received to an electric signal, and the zoom lens includes an object-side lens unit including a prism having a reflecting surface which reflects an optical path, and an object-side sub lens unit having a negative refracting power which is disposed on an object side of the prism, an aperture stop which is disposed on an image side of the object-side lens unit, and which restricts an axial light beam, and a first zooming lens unit having a positive refracting power, which is disposed on the image side of the aperture stop, and which is moved to be closer to the aperture stop at a telephoto end rather than the wide angle end for carrying out zooming, and the object-side lens unit has a position which is fixed at the time of zooming from the wide angle end to the telephoto end, and is a lens unit which is disposed nearest to the object side, and when a surface including an incident-light axis of light which is incident on the reflecting surface, and a reflected-light axis of light which is reflected at the reflecting surface is let to be a reference surface, and a side at which the incident-light axis is with respect to the reflected-light axis is let to be a front side, and a side opposite to the front side with respect to an optical axis of light after reflection is let to be a rear side, the image pickup element has an effective image pickup area having a rectangular shape with a short side and a long side, and the short side of the effective image pickup area is parallel to the reference surface, and the first zooming lens unit includes an object-side lens which is disposed nearest to the aperture stop in the first zooming lens unit, and the object-side lens in the first zooming lens unit has a noncircular outer shape with a part of the front side and the rear side cut out, and in the object-side lens in the first zooming lens unit, an outer size in a direction from the optical axis to the front side is smaller than an outer side in a direction from the optical axis to the rear side, and the object-side lens in the first zooming lens unit has an object-side lens surface which satisfies the following conditional expressions (1), (2), and (3).

$$Lv1\,Er/Lv1\,EL < 0.49 \tag{1}$$

$$0.93 < Lv1\,Ef/IHs \tag{2}$$

$$Lv1\,Ef/Lv1\,Er < 0.99 \tag{3}$$

where,

Lv 1 Er denotes a length of an area of the rear side measured from the optical axis along the reference surface, in an effective area of the object-side lens surface of the object-side lens in the first zooming lens unit, Lv 1 EL denotes a length of an area measured along a direction perpendicular to the reference surface including the optical axis, in the effective area of the object-side lens surface of the object-side lens in the first zooming lens unit, Lv 1 Ef denotes a length of an area of the front side measured from the optical axis along the reference surface, in the effective area of the object-side lens surface of the object-side lens in the first zooming lens unit, and IHs denotes the maximum image height in a direction along the reference surface in the effective image pickup area.

A zoom lens of a type which reflects an optical path is advantageous for slimming of the image pickup apparatus. Disposing a sub lens unit having a negative refracting power on the object side of the reflecting surface is advantageous for securing an angle of field at the wide angle end. By using the prism as a reflecting member, it is possible to make small an optical path by refraction, and it is advantageous for slimming.

The zooming is carried out by moving the zooming lens unit (the first zooming lens unit) having a positive refracting power disposed on the image side of the aperture stop. Here, when an attempt is made to secure a zooming ratio, the zooming lens unit moves away from the aperture stop at the wide angle end. Therefore, a position through which an off-axis chief ray passes, moves away from an optical axis.

Therefore, in the present invention, by letting a direction of the short side of the effective image pickup area to be parallel to the reference surface, it is possible to make small a height of incidence of the chief ray in a frontward and a rearward direction which is a direction from the front side to the rear side. Whereas, a diameter of an off-axis light beam is susceptible to be large due to the zooming lens moving away from the aperture stop.

Therefore, even when a shape of the lens nearest to the object side in the zooming lens unit is let to be a shape with a front side and a rear side of the lens outer shape cut out, the light beam is rarely shielded completely.

Therefore, in the present invention, the zooming lens unit is let to have an arrangement which is advantageous for slimming by making the abovementioned arrangement.

Here, members such as an interfering member, a light shielding member, and a frame which holds the lens for instance are disposed. Therefore, securing a space of the front side of the zooming lens unit is preferable for small sizing of the overall image pickup apparatus.

In the present invention, the abovementioned conditional expressions (1), (2), and (3) are satisfied simultaneously.

Conditional expression (1) is a conditional expression which specifies a preferable Lv 1 Er.

Moreover, conditional expressions (2) and (3) are conditional expressions which specify preferable Lv 1 Ef, and can be rewritten as the following conditional expression as an expression satisfying the two conditions simultaneously.

$$0.93 \times IHs < Lv1\,Ef < 0.99 \times Lv1\,Er \tag{2·3}$$

When an upper limit value in conditional expression (1) and conditional expression (2·3) is surpassed, an efficiency of securing the space is degraded and a merit of slimming is reduced.

When a lower limit value in conditional expression (2·3) is surpassed, it becomes advantageous for small sizing but securing of an amount of light near the maximum image height in a direction of the short side becomes difficult. Moreover, a ghost image due to an internal reflection at an edge portion of the lens is susceptible to occur.

By making such an arrangement, it is possible to provide an image pickup apparatus having a zoom lens which folds an optical path for easy slimming while securing optical performance.

Furthermore, in the abovementioned invention, it is preferable that one or a plurality of the following arrangements is satisfied simultaneously.

Moreover, according to a preferable aspect of the present invention, it is desirable that the prism has an outer shape with a part of the rear side cut out.

An off-axis light beam in the prism becomes thin near the wide angle end, but thick near the telephoto end. On the other hand, it is desirable to make a surface on an incident side of the prism large for securing an angle of field near the wide angle end. Moreover, an effective surface of a surface on an emergence side is susceptible to be smaller than an effective surface on an incidence side.

Therefore, even when the outer shape of the prism is let to have a part of the rear side cut out, an effect on an image is suppressed, and the prism can be made smaller in a direction of thickness.

Furthermore, it is preferable to make the following arrangement.

It is desirable that the object-side lens unit includes an image-side sub lens unit having a positive refracting power which is disposed on an image side of the prism, and each of the prism and the image-side sub lens unit has an outer shape with a part of the rear side cut out.

By disposing such image-side sub lens unit having a positive refracting power, a light beam inside the prism can be made small easily, and it is also advantageous for reducing an aberration of the object-side lens unit.

At this time, following the shape with a part of the rear side of the prism cut out, letting the image-side sub lens unit having a shape with the rear side cut out in a similar manner is advantageous for slimming.

Furthermore, it is desirable that the image pickup apparatus satisfies the following conditional expression (4-1).

$$PeO < PEr < PEf \tag{4-1}$$

where,

PEr denotes a length of an area of the rear side measured from the optical axis along the reference surface, in an effective area of an emergence surface of the prism in the object-side lens unit, PeO denotes a length from an optical axis of a light ray which passes through a position nearest to the optical axis at the emergence surface of the prism, from among light rays which are incident at the maximum image height of the front side on the reference surface, at the wide angle end, and PEf denotes a length of an area of the front side measured along the reference surface from the optical axis in the effective area of the emergence surface of the prism in the object-side lens unit.

Conditional expression (4-1) is a conditional expression which specifies preferable PEr.

When a lower limit value in conditional expression (4-1) is surpassed, it is disadvantageous for securing an image area of an image which is formed. Moreover, due to a reduction in the amount of light, noise at the time of reproducing the image becomes remarkable.

When an upper limit value in conditional expression (4-1) is surpassed, the slimming effect becomes small.

Moreover, according to a preferable aspect of the present invention, it is desirable that the image pickup apparatus satisfies the following conditional expression (4-2).

$$Pec \leq PEr \tag{4-2}$$

where,

PEr denotes a length of an area of the rear side measured along the reference surface from the optical axis in the effective area of the emergence surface of the prism in the object-side lens unit, and Pec denotes a length from the optical axis of a position through which a chief ray which is incident at the maximum image height of the front side on the reference surface passes, at the wide angle end.

Conditional expression (4-2) is a conditional expression which specifies a preferable PEr.

By making an arrangement such that PEr is not lower than Pec, it is advantageous for securing an amount of light of a light beam which is incident at an edge in a direction of the short side. Moreover, it is possible to secure an image height when a size of the opening of the aperture stop is changed.

Moreover, according to a preferable aspect of the present invention, it is desirable that the image pickup apparatus satisfies the following conditional expression (4-3).

$$Pem \leq PEr \tag{4-3}$$

where,

PEr denotes a length of an area of the rear side measured along the reference surface from the optical axis in the effective area of the emergence surface of the prism in the object-side lens unit, and Pem denotes a length of an area of the front side measured along the reference surface from the optical axis in the effective area of the emergence surface of the prism at the wide angle end.

By making an arrangement such that a lower limit value in conditional expression (4-3) is not surpassed, it is advantageous for securing the amount of light of a light beam which is incident at an edge in a direction of the short side at the wide angle end.

Moreover, according to a preferable aspect of the present invention, it is desirable that the image pickup apparatus satisfies the following conditional expression (6)

$$0.90 < L1\,rEr/PEr < 1.1 \tag{6}$$

where,

L1 r Er denotes a length of an area of the rear side measured from the optical axis along the reference surface, in an effective area of the object-side lens surface of the image-side sub lens unit in the object-side lens unit, and PEr denotes the length of the area of the rear side measured from the optical axis along the reference surface, in the effective area of the emergence surface of the prism in the object-side lens unit.

By making an arrangement such that a lower limit value in conditional expression (6) is not surpassed, it is easy to reduce vignetting due to the image-side sub lens unit.

By making an arrangement such that an upper limit value in conditional expression (6) is not surpassed, it is advantageous for slimming in a direction of thickness.

Moreover, according to a preferable aspect of the present invention, it is desirable that the image-side sub lens unit in the object-side lens unit has a noncircular outer shape with apart of the front side and the rear side cut out, and an outer size in the direction from the optical axis to the front side is larger than an outer size in the direction from the optical axis to the rear side.

By allowing a part of the rear side of the image-side sub lens unit to be cut out, it is advantageous for slimming. On the other hand, a portion on a front side of the image-side sub lens unit being cut out makes it easy to dispose the negative lens unit. Here, excessive cutting out does not lead to slimming. Therefore, in order to make it easy to secure the amount of light, it is preferable to let the outer size in a frontward direction to be larger than a size in a direction of the rear side.

Moreover, according to a preferable aspect of the present invention, it is desirable that the object-side lens in the first zooming lens unit has an object-side lens surface which satisfies the following conditional expression (7).

$$0.70 < Lv1\,Er/PEr < 0.98 \qquad (7)$$

where,

PEr denotes the length of the area of the rear side measured from the optical axis along the reference surface in the effective area of the emergence surface of the prism in the object-side lens unit, and Lv 1 Er denotes the length of the area of the rear side measured from the optical axis along the reference surface, in the effective area of the object-side lens surface of the object-side lens in the first zooming lens unit.

By making an arrangement such that a lower limit value in conditional expression (7) is not surpassed, it is easy to suppress a reduction in the amount of light at an edge (end) in the direction of a short side due to vignetting at the first zooming lens unit.

On the other hand, taking into consideration disposing of a holding frame holding the entire zoom lens and a frame which moves holding the zooming lens unit, it is preferable to make an effective area of the zooming lens unit to be smaller than an effective area of the prism at the rear side such that an upper limit in conditional expression (7) is not surpassed.

Moreover, according to a preferable aspect of the present invention, it is desirable that the object-side lens unit has a positive refracting power, and the zoom lens includes a second zooming lens unit having a negative refracting power, which is disposed between the object-side lens unit and the aperture stop, and which is moved to be closer to the aperture stop at the telephoto end rather than the wide angle end for carrying out zooming, and a lens unit having a positive refracting power which is disposed on the image side of the first zooming lens unit, and no other lens unit is provided between the second zooming lens unit and the first zooming lens unit.

Disposing the second zooming lens unit is advantageous for achieving high zooming ratio while suppressing a range of movement of the first zooming lens unit.

By disposing the lens unit having a positive refracting power on the image side of the first zooming lens unit, an exit pupil is susceptible to move away from an image surface, and it is easy to suppress shading in a surrounding portion in an image which is captured.

As compared to a case in which a fixed positive lens is disposed near the aperture stop, it is easy to suppress the number of lens units and to suppress an effect due to decentering, and there is an improvement in yield.

Moreover, according to a preferable aspect of the present invention, it is desirable that the first zooming lens unit includes a plurality of positive lens components having an object side surface which is a convex surface, which are disposed side-by-side on the object side, and a negative lens component having an image-side surface which is a concave surface, which is disposed on an image side of the plurality of positive lens components.

A light beam is incident on the first zooming lens unit upon being diverged. Converging the light beam by the plurality of positive lens components on the object side, and making an off-axis light beam refract in a direction away from the optical axis by disposing the negative lens component having a concave image-side surface on the image side of the positive lens component leads to small sizing of the zooming lens unit.

Here, a lens component is a lens having only two surfaces namely an image-side surface and an object-side surface which is an effective surface in contact with air, and means a single lens or a cemented lens.

Moreover, according to a preferable aspect of the present invention, it is desirable that the zoom lens satisfies the following conditional expression (8).

$$3.4 < fT/fW \qquad (8)$$

where, fT denotes a focal length of the zoom lens at the telephoto end, and fW denotes a focal length of the zoom lens at the wide angle end.

It is preferable to secure zooming ratio by making an arrangement such that a lower limit value in conditional expression (8) is not surpassed. It is easy to show merit of small sizing by using a lens having a shape as in the present patent application.

Furthermore, it is preferable that the abovementioned zoom lens satisfies the following conditional expression (8-1).

$$50° > \omega W > 38.0° \qquad (8\text{-}1)$$

where,

ω denotes the maximum half angle of field of the zoom lens at the wide angle end.

It is preferable to secure an angle of field by making an arrangement such that a lower limit value in conditional expression (8-1) is not surpassed.

It is preferable to reduce vignetting by making an arrangement such that an upper limit value in conditional expression (8-1) is not surpassed.

Moreover, according to a preferable aspect of the present invention, it is desirable that the image pickup apparatus further includes a display monitor which is disposed on the rear side of the zoom lens, and a center of an image pickup surface of the image pickup element is positioned on a front side with respect to a center of the effective image pickup area.

Shifting the center of the image pickup surface of the image pickup element toward the front side of the optical axis leads to securing a space on the rear side, and even when a large-size display monitor is disposed on the rear side, it is possible to suppress a thickness of the image pickup apparatus.

Moreover, according to a preferable aspect of the present invention, it is desirable that the image pickup apparatus further includes a correction circuit which corrects electrically an image which has been picked up by the image pickup element, and that the correction circuit has a correction-parameter storage unit which holds parameters for correcting brightness differing at the front side and the rear side of a center of an image for correcting a rate of decrease in an asymmetric brightness of the front side and the rear side of the zoom lens.

Accordingly, it is possible to correct by signal processing, an exposure difference at the front side and the rear side which is due to vignetting of a light beam, and it is possible to achieve a favorable image.

Moreover, according to a preferable aspect of the present invention, it is desirable that the correction-parameter storage unit has correction parameters which differ for the front side and the rear side corresponding to each state of an asymmetric exposure difference which varies according to zooming of the zoom lens and a change in an area of opening of the aperture stop.

Accordingly, it is possible to carry out correction according to asymmetric exposure difference which changes according to a state of the zoom lens, and therefore it is preferable.

Apart from this, in order to correct an asymmetric image change which is due to asymmetric vignetting, it is preferable to correct by image processing, a difference in a depth of field in a surrounding portion, a difference in an image distortion, and a difference in shading.

Moreover, it is preferable to carry out correction in which, vignetting has been taken into consideration according to a photometric area or a focusing area.

Moreover, it is preferable to make an arrangement such that an image processing is carried out in advance to reduce an effect due to asymmetry of vignetting, and thereafter, image conversion of a filter effect due to image processing is carried out.

According to a preferable aspect of the present invention, it is desirable that the zoom lens satisfies the following conditional expression (9) when the aperture stop is open at the wide angle end.

$$-3.5 < EV_{c-f} < -0.7 \tag{9}$$

where, $EV_{c-f}$ denotes a value obtained by subtracting an EV value at the maximum image height of the front side along the reference surface at the wide angle end from an EV value on an axis at the wide angle end.

By making an arrangement such that a lower limit value in conditional expression (9) is not surpassed, it is easy to reduce occurrence of noise due to correction of amount of exposure by signal processing.

By making an arrangement such that an upper limit value in conditional expression (9) is not surpassed, it is advantageous for securing a space on the front side of the first zooming lens unit.

When the zoom lens has a focusing mechanism, each of the abovementioned arrangements is let to be an arrangement in a state of being focused at the longest distance.

It is preferable that each or a plurality of the abovementioned requirements (conditional expressions) is satisfied simultaneously.

It is preferable to let the numerical data take the following values as it will lead to more assured effect.

In conditional expression (1), it is preferable to let the upper limit value to be 0.46.

In conditional expression (2), it is preferable to let the lower limit value to be 0.95, 0.97, and the lower limit value of 1.00 is more preferable.

In conditional expression (3), it is preferable to let the upper limit value to be 0.975.

In conditional expression (6), it is preferable to let the lower limit value to be 0.95, and the lower limit value of 0.99 is more preferable.

In conditional expression (6), it is preferable to let the upper limit value to be 1.05, and the upper limit value of 1.01 is more preferable.

In conditional expression (7), it is preferable to let the lower limit value to be 0.73, and the lower limit value of 0.85 is more preferable.

In conditional expression (7), it is preferable to let the upper limit value to be 0.95, and the upper limit value of 0.92 is more preferable.

In conditional expression (8), it is preferable to let the lower limit value to be 4.5.

In conditional expression (8), the upper limit value of 15.0 may be provided, and an arrangement may be made such that the upper limit value of 15.0 is not surpassed.

It becomes easy to suppress an increase in size of the zoom lens along the optical direction, and it is advantageous for small sizing in a direction other than the direction of thickness of the image pickup apparatus. Furthermore, the upper limit value may be let to be 10.0.

In conditional expression (9), it is preferable to let the lower limit value to be −2.5, and the lower limit value of −0.2 is more preferable.

In conditional expression (9), it is preferable to let the upper limit value to be −0.1, and the upper limit value −1.5 is more preferable.

Exemplary embodiments of an image pickup apparatus according to the present invention will be described below by referring to the accompanying diagrams. However, the present invention is not restricted to the embodiments described below.

Embodiments of the present patent application will be described below.

FIG. 1A, FIG. 1B, and FIG. 2 show cross-sectional views of a zoom lens with an optical path in a first embodiment of the present invention.

FIG. 3A, FIG. 3B, FIG. 3C, FIG. 3D, FIG. 4A, FIG. 4B, FIG. 5A, FIG. 5B, FIG. 6A, FIG. 6B, FIG. 6C, FIG. 7A, FIG. 7B, and FIG. 7C show an effective area and an outer shape of a typical lens of the first embodiment.

Moreover, a surface including an incident-light axis and a reflected-light axis of a prism is let to be a paper surface. The paper surface is a direction of a short side of the image pickup element.

In examples (In the embodiments) which will be described later, a first lens unit G1 corresponds to the object-side lens unit of the present invention, and a third lens unit G3 corresponds to the first zooming lens unit of the present invention.

Moreover, as shown in the diagrams, the object-side sub lens unit of the first lens unit G1 is let to have a shape which is symmetric with respect to the paper surface in FIG. 1A, FIG. 1B, and FIG. 2. A case of an image pickup apparatus in which, the optical axis is directed to a lower side of the image pickup apparatus after being reflected at the prism will be described below.

FIG. 3A, FIG. 3B, FIG. 3C, and FIG. 3D (hereinafter, FIG. 3A to FIG. 3D) show cross-sectional view of the object-side sub lens unit in the first lens unit G1. The object-side sub lens unit is symmetrical in left-right direction of the image pickup apparatus (refer to FIG. 12), and moreover, is let to have an asymmetric shape in a vertical direction of the image pickup apparatus. In other words, FIG. 3A shows a cross-sectional view on a surface parallel to a paper surface as defined above of the object-side sub lens unit. FIG. 3B shows a view as seen from a side where the light beam is incident on the object-side sub lens unit. FIG. 3C shows a cross-sectional view on a surface perpendicular to the paper surface including the optical axis of the object-side sub lens unit. FIG. 3D shows a view as seen from a side where the light beam is emerged from the object-side sub lens unit.

When a short side in the vertical direction of the outer shape is let to be an upper side, small sizing in a direction of height of the image pickup apparatus and moving a surface on a lower side of the lens away from an effect surface are advantageous for reducing the ghost image.

When the short side is let to be an upper side, there is enough space for disposing the image-side lens unit in the first lens unit.

Moreover, an effective area of the object-side surface of the object-side sub lens unit is shown by oblique lines. Both the vertical direction and the horizontal direction are let to be almost a symmetrical oval shape.

Figure 4A:
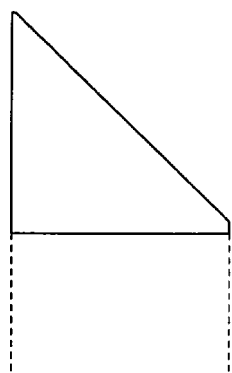
FIG. 4A and FIG. 4B are diagrams showing an effective area and a shape of a prism in the first lens unit (object-side lens unit) of the zoom lens in the image pickup apparatus of the first embodiment.
Figure 4B:
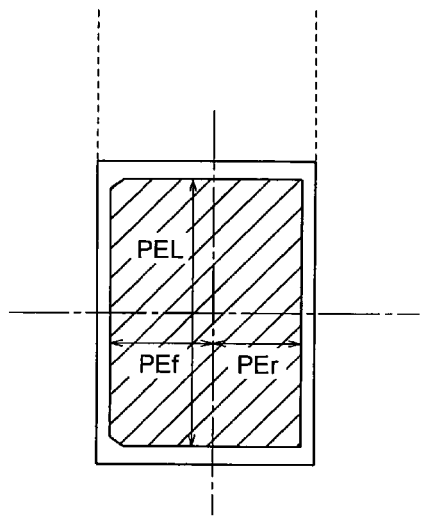

FIG. 4A shows a cross-sectional view when the prism is seen from a surface parallel to the paper surface. FIG. 4B shows a view when the prism is seen from the image side of the image pickup apparatus. An outer shape of the prism is let to be a shape in which a rear side of the emergence surface is cut out as shown in FIG. 4A.

In FIG. 4B, an effective area on the emergence surface of the prism is shown by oblique lines. The effective area of the rear side is smaller than the effective area of the front side. Moreover, parameters PEL, PEf, and PEr in conditional expressions are shown collectively in the diagram.

As it has been described above, the size and the effective area of the rear side of the prism are determined such that the chief ray of the off-axis light beam is not vignetted.

Figure 5A:
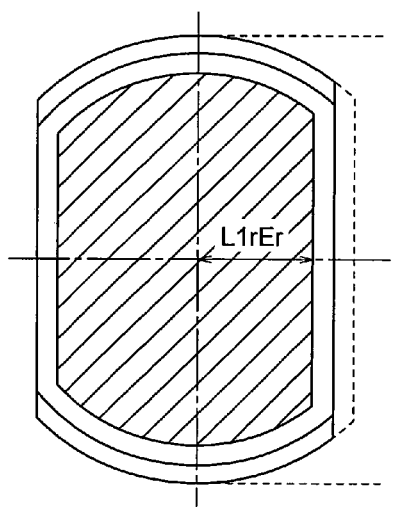
FIG. 5A and FIG. 5B are diagrams showing an effective area and a shape of an image-side sub lens unit in the first lens unit (object-side lens unit) of the zoom lens in the image pickup apparatus of the first embodiment.
Figure 5B:
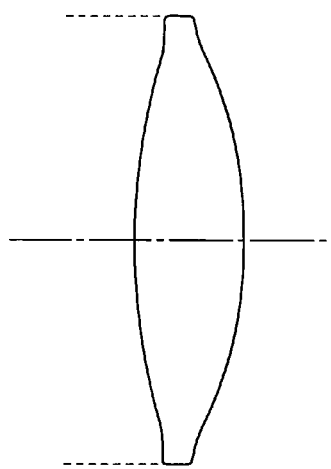

FIG. 5A shows a view when the image-side sub lens unit in the first lens unit G1 is seen from a side where the light beam is incident. FIG. 5B shows a cross-sectional view on a surface perpendicular to the paper surface including an optical axis of the image-side sub lens unit in the first lens unit G1. An outer shape of the image-side sub lens unit is let to be a shape, with a part of the front side and the rear side cut out symmetrically in the horizontal direction as shown in FIG. 5A. The manner in which a part of the front side and the rear side is cut out, in other words, when a circular shape is let to be a base, a size of an area which is cut out in the image-size sub lens unit as compared to the circular shape is larger for the rear side than the front side.

An arrangement is made such that the size of the rear side of the image-side sub lens unit is almost the same in accordance with the size of the prism. Moreover, in FIG. 5A, the effective area on the object-side surface of the image-side sub lens unit is a range shown by oblique lines.

The effective area of the rear side is smaller than the effective area of the front side. Furthermore, parameter L1 r E in conditional expressions is also shown collectively in the diagram.

A second lens unit G2 is not shown particularly in the diagram. The second lens unit G2 is a lens unit which can be made smaller easily. Therefore, the second lens unit G2 is let to have a shape which cannot be larger at the front side and the rear side than the first lens unit G1 and the third lens unit G3. It is preferable to let the shape of the second lens unit G2 to be circular or oval.

An aperture stop S is an aperture (diaphragm) having a circular opening. An area of opening of the aperture stop S may be let to be variable with an optical axis as a center. Moreover, the aperture stop S, without restricting to the circular shape, may be let to be elliptical with a long side of the ellipse perpendicular to the paper surface.

Figure 6A:
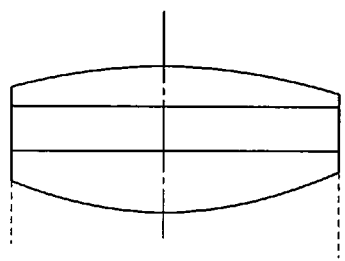
FIG. 6A, FIG. 6B, and FIG. 6C are diagrams showing an effective area and a shape of an object-side lens in a third lens unit (first zooming lens unit) of the zoom lens in the image pickup apparatus of the first embodiment.
Figure 6B:
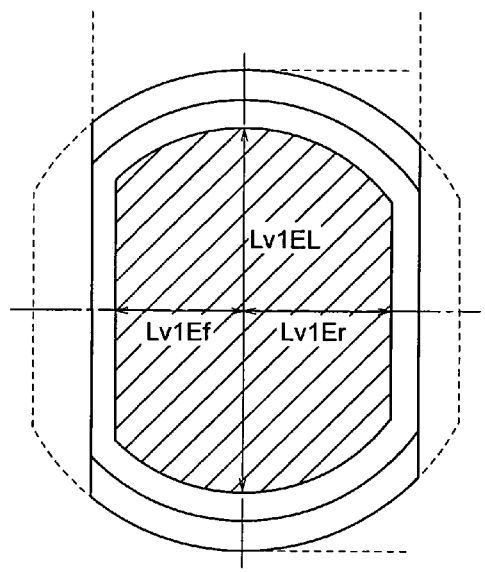
Figure 6C:
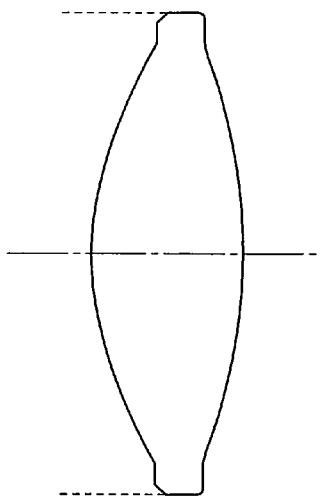

FIG. 6A shows a view (top view) as seen from a direction perpendicular to the paper surface of the object-side lens in the third lens unit G3. FIG. 6B shows a view (front view) when the object-side lens is seen from a side where light beam is incident. FIG. 6C shows a cross-sectional view (side view) on a surface perpendicular to the paper surface including the optical axis of the object-side lens. The object-side lens has an outer shape with a part of the front side and the rear side. The manner in which a part of the front side and the rear side is cut out is larger for the front side than for the rear side.

A length of the rear side of the object-side lens is set to be somewhat smaller than the prism, based on the size of the rear side of the image-side sub lens unit and the prism in the first lens unit, and taking into consideration that it is a movable unit.

In FIG. 6B, the effective area of the object-side surface of the object-side lens is shown by oblique lines. An arrangement is such that the effective area is smaller for the front side than for the rear side.

Moreover, although it is not shown in the diagram, the other lenses of the third lens unit are let to have a shape in which the front side and the rear side are cut out according to the size of the object-side lens unit. In FIG. 6B, parameters Lv 1 Er, Lv 1 Ef, and Lv 1 EL in conditional expressions are shown collectively.

As a member which determines the effective area, a frame holding the lens, blackening of a portion around the lens surface, and a diaphragm member having an opening portion may be taken into consideration. It is a normal practice to carry out by blackening, which also leads to a cost reduction.

Figure 7A:
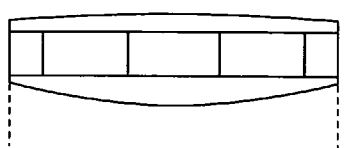
FIG. 7A, FIG. 7B, and FIG. 7C are diagrams showing an effective area and a shape of a fourth lens unit of the zoom lens in the image pickup apparatus of the first embodiment.
Figure 7B:
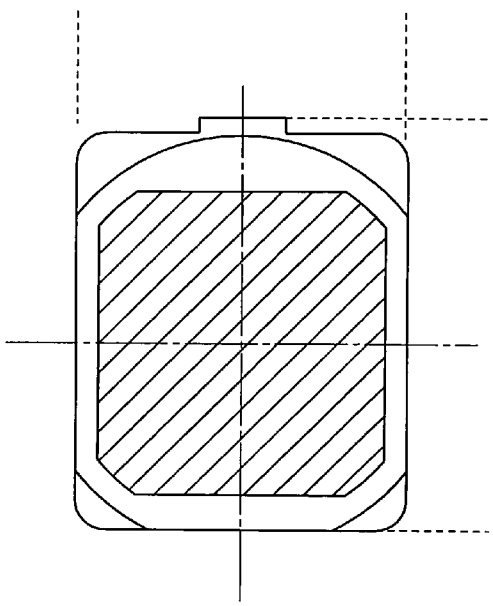
Figure 7C:
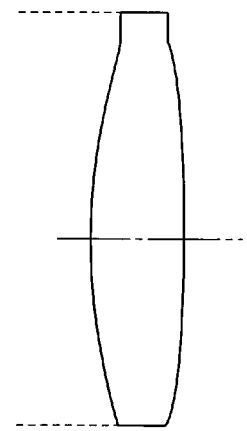

FIG. 7A shows a view (top view) as seen from a direction perpendicular to a paper surface of a lens in a fourth lens unit G4. FIG. 7B shows a view (front view) as seen from a side on which, light beam is incident on the lens in the fourth lens unit G4. FIG. 7C shows a cross-sectional view (side view) on a surface perpendicular to a paper surface including an optical axis of the lens in the fourth lens unit G4.

The lens in the fourth lens unit G4 has a substantially rectangular external shape as shown in FIG. 7B. A side of a site (upper end in the diagram) which is protruded in FIG. 7B (front view) is connected to a motor (not shown in the diagram) for moving the fourth lens unit G4 for focusing.

Moreover, in FIG. 7B, an effective area of a lens object-side surface in the fourth lens unit G4 is shown by oblique lines. Since the fourth lens unit G4 is disposed at a position near the image pickup element, the fourth lens unit G4 has a substantially rectangular shape close to a shape of the image pickup surface.

The first embodiment, a second embodiment, and a third embodiment of the zoom lens of the present invention will be described below. FIG. 1A, FIG. 1B, and FIG. 2 are lens cross-sectional views showing an optical arrangement at the time of infinite object point focusing of the zoom lens according to the first embodiment of the present invention, where, FIG. 1A shows a state at a wide angle end, FIG. 1B shows an intermediate focal length state, and FIG. 2 shows a state at a telephoto end. In FIG. 1A, FIG. 1B, and FIG. 2, G1 denotes a first lens unit, G2 denotes a second lens unit, S denotes an aperture stop, G3 denotes a third lens unit, G4 denotes a fourth lens unit, F denotes a parallel flat plate which forms a low pass filter on which, a wavelength-region restricting coating which restricts infrared light is applied, C denotes a parallel flat plate of a cover glass of an electronic image pickup element, and I denotes an image surface (an image plane). A multilayer film for restricting wavelength region may be applied to a surface of the cover glass G. Moreover, an arrangement may be made such that the cover glass C has a low pass filter effect.

Numerical data is data when focused to an object at infinite distance. A unit of length of numerical values is mm, a unit of angle is degrees (°), and focusing in each embodiment is carried out by moving a lens unit nearest to the image side.

The zoom lens of the first embodiment, as shown in FIG. 1A, FIG. 1B, and FIG. 2, includes in order from an object side, a first lens unit G1 having a positive refracting power, a second lens unit G2 having a negative refracting power, an aperture stop S, a third lens unit G3 having a positive refracting power, and a fourth lens unit G4 having a positive refracting power.

At the time of zooming from the wide angle end to the telephoto end, the first lens unit G1 is fixed, the second lens unit G2 moves toward an image side, the aperture stop S is fixed, and the third lens unit G3 moves toward the object side. Moreover, the fourth lens unit G4 moves for correction of an image plane, and moves toward the object side at the time of focusing of an object at a short distance.

In order from the object side, the first lens unit G1 includes a negative meniscus lens having a convex surface directed toward the object side, an optical-path bending prism, and a biconvex positive lens. The second lens unit G2 includes a biconcave negative lens, and a cemented lens of a positive meniscus lens having a convex surface directed toward the image side and a biconcave negative lens. The third lens unit G3 includes a biconvex positive lens, a cemented lens of a biconvex positive lens and a biconcave negative lens, and a cemented lens of a negative meniscus lens having a concave surface directed toward the image plane side and a positive meniscus lens having a concave surface directed toward the image plane side. The fourth lens unit G4 includes a biconvex positive lens.

An aspheric surface is used for eight surfaces namely, both surfaces of the biconvex positive lens in the first lens unit G1, both surfaces of the biconcave negative lens in the second lens unit G2, both surfaces of the biconvex positive lens on the object side in the third lens unit G3, and both surfaces of the biconvex positive lens in the fourth lens unit G4.

Moreover, in the second embodiment, the third embodiment, and examples thereof, since an external shape of each lens is almost the same as in FIG. 4A, FIG. 4B, FIG. 5A, FIG. 5B, FIG. 6A, FIG. 6B, FIG. 6C, FIG. 7A, FIG. 7B, FIG. 7C, FIG. 8A, and FIG. 8B, only a lens cross-sectional view is shown, and values associated with the present invention are described in a table.

Figure 8B:
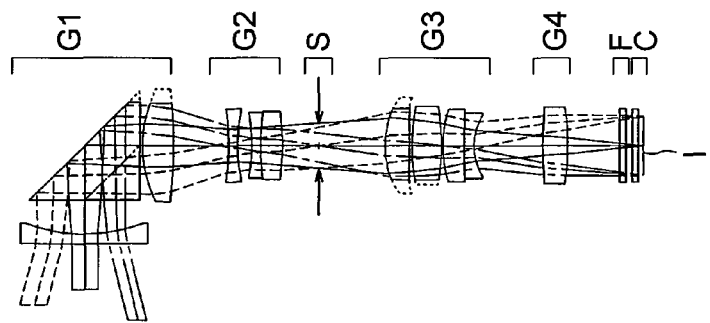
FIG. 8B is a cross-sectional view with an optical path at an intermediate focal length state of the zoom lens in the image pickup apparatus of the second embodiment.
Figure 8A:
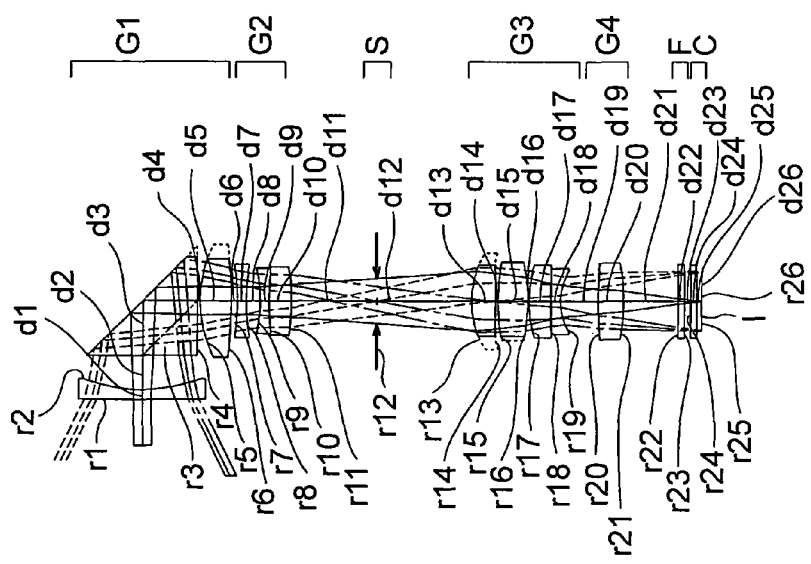
FIG. 8A is a cross-sectional view with an optical path at a wide angle end of a zoom lens in an image pickup apparatus of a second embodiment.
Figure 9:
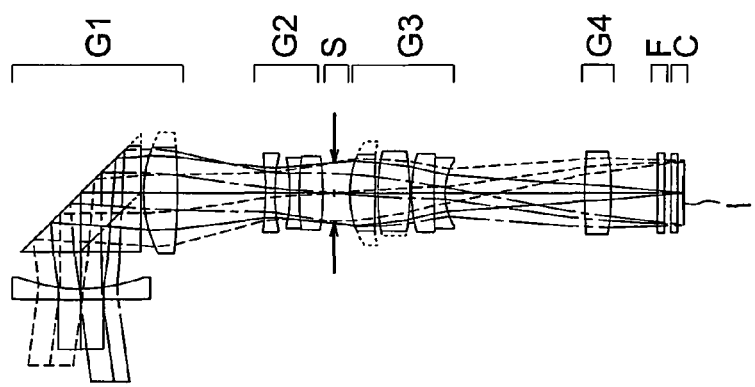
FIG. 9 is a cross-sectional view with an optical path, at a telephoto end of the zoom lens in the image pickup apparatus of the second embodiment.

A zoom lens of the second embodiment, as shown in FIG. 8A, FIG. 8B, and FIG. 9, includes in order from an object side, a first lens unit G1 having a positive refracting power, a second lens unit G2 having a negative refracting power, an aperture stop S, a third lens unit G3 having a positive refracting power, and a fourth lens unit G4 having a positive refracting power.

At the time of zooming from the wide angle end to the telephoto end, the first lens unit G1 is fixed, the second lens unit G2 moves toward an image side, the aperture stop S is fixed, and the third lens unit G3 moves toward the object side. Moreover, the fourth lens unit G4 moves for correction of an image plane, and moves toward the object side at the time of focusing to an object at a short distance.

In order from the object side, the first lens unit G1 includes a negative meniscus lens having a convex surface directed toward the object side, an optical-path bending prism, and a biconvex positive lens. The second lens unit G2 includes a biconcave negative lens, and a cemented lens of a biconcave negative lens and a biconvex positive lens. The third lens unit G3 includes a biconvex positive lens, a biconvex positive lens, a positive meniscus lens having a concave surface directed toward the image plane side, and a negative meniscus lens having a concave surface directed toward the image plane side. The fourth lens unit G4 includes a biconvex positive lens.

An aspheric surface is used for seven surfaces namely, a surface on the image side of the negative meniscus lens and both surfaces of the biconvex positive lens in the first lens unit G1, both surfaces of the biconvex positive lens on the object side in the third lens unit G3, and both surfaces of the biconvex positive lens in The fourth lens unit G4.

Figure 11:
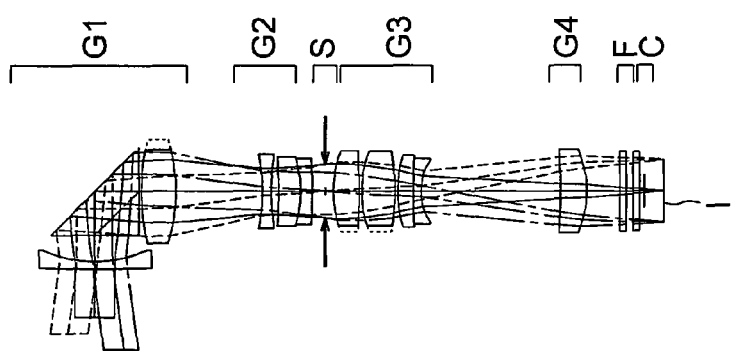
FIG. 11 is a cross-sectional view with an optical path at a telephoto end of the zoom lens in the image pickup apparatus of the first embodiment.

A zoom lens of the third embodiment, as shown in FIG. 10A, FIG. 10B, and FIG. 11, includes in order from an object side, a first lens unit G1 having a positive refracting power, a second lens unit G2 having a negative refracting power, an aperture stop S, a third lens unit G3 having a positive refracting power, and a fourth lens unit G4 having a positive refracting power.

At the time of zooming from the wide angle end to the telephoto end, the first lens unit G1 is fixed, the second lens unit G2 moves toward an image side, the aperture stop S is fixed, and the third lens unit G3 moves toward the object side. Moreover, the fourth lens unit G4 moves for correction of an image plane, and moves toward the object side at the time of focusing to an object at a short distance.

In order from the object side, the first lens unit G1 includes a negative meniscus lens having a convex surface directed toward the object side, an optical-path bending prism, and a biconvex positive lens. The second lens unit G2 includes a biconcave negative lens, and a cemented lens of a positive meniscus lens having a convex surface directed toward the image side and a negative meniscus lens having a convex surface directed toward the image side. The third lens unit G3 includes a biconvex positive lens, a biconvex positive lens, and a cemented lens of a positive meniscus lens having a concave surface directed toward the image plane side and a negative meniscus lens having a concave surface directed toward the image side. The fourth lens unit G4 includes a positive meniscus lens having a convex surface directed toward the image plane side.

An aspheric surface is used for seven surfaces namely, a surface on the image side of the negative meniscus lens and both surfaces of the biconvex positive lens in the first lens unit G1, both surfaces of the biconvex positive lens on the object side in the third lens unit G3, and both surfaces of the biconvex positive lens in the fourth lens unit G4.

Numerical data of each embodiment described above is shown below. Apart from symbols described above, FL denotes a focal length of the entire zoom lens system, $F_{NO}$ denotes an F number, ω denotes a half angle of field, each of r1, r2, denotes radius of curvature of each lens surface, each of d1, d2, . . . denotes a distance between two lenses, each of nd1, nd2, . . . denotes a refractive index of each lens for a d-line, and each of 84 d1, vd2, denotes an Abbe constant for each lens. Further, * denotes an aspheric data.

When x is let to be an optical axis with a direction of traveling of light as a positive (direction), and y is let to be in a direction orthogonal to the optical axis, a shape of the aspheric surface is described by the following expression.

$$x=(y^2/r)/[1+\{1-(K+1)(y/r)^2\}^{1/2}]+A_4y^4+A_6y^6+A_8y^8+A_{10}y^{10}+A_{12}y^{12}$$

where, r denotes a paraxial radius of curvature, K denotes a conical coefficient, $A_4$, $A_6$, $A_8$, $A_{10}$, and $A_{12}$ denote aspherical surface coefficients of a fourth order, a sixth order, an eight order, a tenth order, and a twelfth order respectively. Moreover, in the aspherical surface coefficients, 'e-n' (where, n is an integral number) indicates '$10^{-n}$'.

EXAMPLE 1

Unit mm

Surface data

| Surface no. | r | d | nd | vd |
|---|---|---|---|---|
| Object plane | ∞ | ∞ | | |
| 1 | 45.3665 | 0.7 | 2.00069 | 25.46 |
| 2 | 10.2107 | 2.62 | | |
| 3 | ∞ | 8.15 | 1.84666 | 23.78 |
| 4 | ∞ | 0.2 | | |
| 5* | 18.133 | 2.7472 | 1.6935 | 53.21 |
| 6* | −12.3279 | −0.5 | | |
| 7 | ∞ | Variable | | |
| 8* | −13.0437 | 0.7 | 1.8061 | 40.92 |
| 9* | 27.0694 | 0.61 | | |
| 10 | −25.2804 | 1.72 | 1.92286 | 20.88 |
| 11 | −8.3108 | 0.4773 | 1.816 | 46.62 |
| 12 | 4.54E+04 | Variable | | |
| 13 (Stop) | ∞ | Variable | | |
| 14* | 7.1238 | 2.8248 | 1.497 | 81.54 |
| 15* | −12.1151 | 0.2 | | |
| 16 | 15.0222 | 3.6788 | 1.497 | 81.54 |
| 17 | −11.0558 | 0.5 | 1.72916 | 54.68 |
| 18 | 39.8058 | 0.5908 | | |
| 19 | 9.6808 | 0.5 | 2.00069 | 25.46 |
| 20 | 4.1507 | 1.96 | 1.58913 | 61.14 |
| 21 | 5.15 | Variable | | |
| 22* | 13.6247 | 1.8884 | 1.53071 | 55.6 |
| 23* | −58.9893 | Variable | | |
| 24 | ∞ | 0.5 | 1.51633 | 64.14 |
| 25 | ∞ | 0.5 | | |
| 26 | ∞ | 0.5 | 1.51633 | 64.14 |
| 27 | ∞ | 0.37 | | |
| 28 Image plane (paraxial image plane) | ∞ | (Variable) | | |

Aspherical surface data

5th surface

κ = 0
A4 = −1.2216E−05, A6 = −2.3441E−07, A8 = −4.0688E−08,
A10 = −2.9950E−11

6th surface

κ = 0.1399
A4 = 1.4627E−04, A6 = −6.2795E−07, A8 = −2.0350E−08,
A10 = −1.5266E−10

8th surface

κ = 0
A4 = −1.8897E−04, A6 = −6.1814E−06, A8 = 1.8227E−06,
A10 = −9.1120E−08

-continued

Unit mm

9th surface

κ = 0
A4 = −4.3016E−04, A6 = 4.3846E−06, A8 = 1.4370E−06,
A10 = −1.2267E−07

14th surface

κ = 0
A4 = −4.8642E−04, A6 = 7.9384E−07, A8 = −4.6316E−08,
A10 = −8.6511E−10

15th surface

κ = 0
A4 = 1.9041E−04, A6 = 2.2176E−06, A8 = 1.4931E−08,
A10 = 0.0000E+00

22nd surface

κ = 0
A4 = 8.4070E−05, A6 = 1.5676E−05, A8 = −3.9243E−06,
A10 = 1.4920E−07

23rd surface

κ = 0
A4 = 2.4046E−04, A6 = −3.0261E−06, A8 = −3.5165E−06,
A10 = 1.5194E−07

Zoom data (∞)

| | Wide angle | Intermediate | Telephoto |
|---|---|---|---|
| ω | 41.2 | 18.8 | 8.6 |
| Fno | 4 | 5.42 | 5.98 |
| FL | 5.13 | 10.69 | 24.41 |
| d7 | 1.07 | 5.01718 | 8.11085 |
| d12 | 7.81576 | 3.87953 | 0.79274 |
| d13 | 9.32878 | 6.01909 | 0.79154 |
| d21 | 2.40651 | 5.56161 | 10.37915 |
| d23 | 3.08094 | 3.23394 | 3.64518 |
| (d28 | −0.00005 | −0.00007 | −0.00019) |

Moreover, three examples of the lens cross section in the first embodiment in common are given in the following table as examples 1-1, 1-2, and 1-3, as numerical values related to the effective size in conditional expressions.

| | Example 1-1 | Example 1-2 | Example 1-3 |
|---|---|---|---|
| IHs | 2.42 | 2.42 | 2.42 |
| Lv1Ef | 2.60 | 3.30 | 3.00 |
| Lv1Er | 2.70 | 3.40 | 3.10 |
| Lv1EL | 7.40 | 7.40 | 7.40 |
| L1rEr | 3.00 | 3.60 | 3.40 |
| Pem | 2.90 | 2.90 | 2.90 |
| PEr | 2.90 | 3.50 | 3.40 |
| PEf | 3.58 | 3.58 | 3.58 |
| Pe0 | 2.25 | 1.96 | 2.08 |
| Pec | 2.62 | 2.62 | 2.62 |
| PEL | 10.40 | 10.40 | 10.40 |
| fW | 5.13 | 5.13 | 5.13 |
| fT | 24.41 | 24.41 | 24.41 |
| Lv1Er/Lv1EL | 0.365 | 0.459 | 0.419 |
| Lv1Ef/IHs | 1.074 | 1.364 | 1.240 |
| Lv1Ef/Lv1Er | 0.963 | 0.971 | 0.968 |
| L1rEr/PEr | 1.03 | 1.03 | 1.00 |
| Lv1Er/PEr | 0.931 | 0.971 | 0.912 |
| fT/fW | 4.76 | 4.76 | 4.76 |
| EVc − f | −1.7 | −1.2 | −1.3 |

EXAMPLE 2

Unit mm

Surface data

| Surface no. | r | d | nd | vd |
|---|---|---|---|---|
| Object plane | ∞ | ∞ | | |
| 1 | 494.305 | 0.8 | 2.00069 | 25.46 |
| 2* | 11.811 | 2.81 | | |
| 3 | ∞ | 9 | 1.834 | 37.16 |
| 4 | ∞ | 0.2 | | |
| 5* | 9.368 | 2.55 | 1.713 | 53.87 |
| 6* | −40.214 | Variable | | |
| 7 | −22.842 | 0.7 | 1.883 | 40.76 |
| 8 | 14.261 | 1.15 | | |
| 9 | −13.699 | 0.7 | 1.883 | 40.76 |
| 10 | 20.441 | 1.8 | 1.92286 | 20.88 |
| 11 | −20.24 | Variable | | |
| 12 | ∞ | Variable | | |
| 13* | 7.979 | 1.95 | 1.61772 | 49.81 |
| 14* | −66.841 | 0.2 | | |
| 15 | 15.96 | 2.43 | 1.497 | 81.54 |
| 16 | −18.074 | 0.1 | | |
| 17 | 10.141 | 1.73 | 1.48749 | 70.23 |
| 18 | 60.508 | 0.8 | 1.92286 | 20.88 |
| 19 | 4.794 | Variable | | |
| 20* | 20.078 | 2 | 1.497 | 81.54 |
| 21* | −32.393 | Variable | | |
| 22 | ∞ | 0.5 | 1.51633 | 64.14 |
| 23 | ∞ | 0.5 | | |
| 24 | ∞ | 0.5 | 1.51633 | 64.14 |
| 25 | ∞ | 0.37 | | |
| 26 Image plane (paraxial image plane) | ∞ | (Variable) | | |

Aspherical surface data

2nd surface $\kappa = 0$
A4 = −2.7364E−04, A6 = 1.4504E−06, A8 = −1.8043E−08,
A10 = 1.0118E−11

5th surface $\kappa = 0$
A4 = −1.6610E−04, A6 = −2.1998E−06, A8 = 3.7691E−08,
A10 = 8.0754E−10

6th surface $\kappa = 0$
A4 = 9.0942E−05, A6 = −2.7554E−06, A8 = 8.6822E−08,
A10 = 2.9636E−10

13th surface $\kappa = 0$
A4 = 1.4635E−04, A6 = 1.3240E−06, A8 = 1.8472E−06,
A10 = −1.6558E−08

14th surface $\kappa = 0$
A4 = 7.3575E−04, A6 = 4.9561E−06, A8 = 2.2287E−06,
A10 = 0.0000E+00

20th surface $\kappa = 0$
A4 = −1.1206E−03, A6 = 0.0000E+00, A8 = 0.0000E+00,
A10 = 0.0000E+00

21st surface $\kappa = 0$
A4 = −1.1206E−03, A6 = 1.9313E−06, A8 = 1.1559E−06,
A10 = −2.5715E−08

-continued

Unit mm

Zoom data (∞)

| | Wide angle | Intermediate | Telephoto |
|---|---|---|---|
| ω | 39.1 | 20.9 | 11.6 |
| Fno | 3.57 | 4.37 | 5.09 |
| FL | 5.07 | 9.37 | 17.43 |
| d6 | 0.5 | 4.47 | 6.59 |
| d11 | 6.93 | 2.96 | 0.84 |
| d12 | 7.68 | 5.39 | 1.16 |
| d19 | 3 | 5.51 | 10.48 |
| d21 | 4.47 | 4.25 | 3.5 |
| (d26 | 0.03646 | 0.04818 | 0.0876) |

Moreover, two examples of the lens cross section in the second embodiment in common are given in the following table as examples 2-1 and 2-2, as numerical values related to the effective size in conditional expressions.

| | Example 2-1 | Example 2-2 |
|---|---|---|
| IHs | 2.42 | 2.42 |
| Lv1Ef | 2.45 | 2.45 |
| Lv1Er | 2.65 | 2.65 |
| Lv1EL | 6.90 | 6.90 |
| L1rEr | 3.40 | 3.40 |
| PEm | 3.30 | 3.30 |
| PEr | 3.30 | 3.60 |
| PEf | 4.00 | 4.00 |
| Pe0 | 2.07 | 2.07 |
| Pec | 2.55 | 2.55 |
| PEL | 11.00 | 11.00 |
| fW | 5.07 | 5.07 |
| fT | 17.43 | 17.43 |
| Lv1Er/Lv1EL | 0.384 | 0.384 |
| Lv1Ef/IHs | 1.012 | 1.012 |
| Lv1Ef/Lv1Er | 0.925 | 0.925 |
| L1rEr/PEr | 1.03 | 0.94 |
| Lv1Er/PEr | 0.803 | 0.736 |
| fT/fW | 3.44 | 3.44 |
| EVc − fv | −0.8 | −0.8 |

EXAMPLE 3

Unit mm

Surface data

| Surface no. | r | d | nd | vd |
|---|---|---|---|---|
| Object plane | ∞ | ∞ | | |
| 1 | 101.058 | 0.6 | 2.00069 | 25.46 |
| 2* | 9.8 | 2 | | |
| 3 | ∞ | 7.8 | 1.84666 | 23.78 |
| 4 | ∞ | 0.2 | | |
| 5* | 16.913 | 2.5918 | 1.76802 | 49.24 |
| 6* | −14.0938 | Variable | | |
| 7 | −16.3299 | 0.7 | 1.77377 | 47.17 |
| 8 | 13.9182 | 0.5637 | | |
| 9 | −45.156 | 1.7 | 1.92286 | 20.88 |
| 10 | −9.7361 | 0.8923 | 1.883 | 40.76 |
| 11 | −61.2033 | Variable | | |
| 12 | ∞ | Variable | | |
| 13* | 7.922 | 1.9956 | 1.58313 | 59.38 |
| 14* | −39.4331 | 0.2 | | |
| 15 | 8.5926 | 2.5 | 1.497 | 81.54 |
| 16 | −20.3394 | 0.2 | | |
| 17 | 8.7662 | 1.2 | 1.51742 | 52.43 |

-continued

Unit mm

| | | | | |
|---|---|---|---|---|
| 18 | 36.4003 | 0.5781 | 2.00069 | 25.46 |
| 19 | 3.9484 | Variable | | |
| 20* | −42.8587 | 2 | 1.5311 | 55.91 |
| 21* | −8.0127 | Variable | | |
| 22 | ∞ | 0.5 | 1.51633 | 64.14 |
| 23 | ∞ | 0.5 | | |
| 24 | ∞ | 0.5 | 1.51633 | 64.14 |
| 25 | ∞ | 0.37 | | |
| 26 Imageplane (paraxial image plane) | ∞ | (Variable) | | |

Aspherical surface data

5th surface $\kappa = 0$
A4 = 1.0255E−05, A6 = −2.9963E−06, A8 = 1.5670E−07,
A10 = −3.2823E−09

6th surface $\kappa = 0$
A4 = 1.3596E−04, A6 = −3.2171E−06, A8 = 1.5396E−07,
A10 = −3.1268E−09

7th surface $\kappa = 0$
A4 = −3.3996E−04, A6 = 1.0901E−05, A8 = −6.3662E−07,
A10 = 2.9087E−08

8th surface $\kappa = 0$
A4 = −6.1175E−04, A6 = 1.8130E−05, A8 = −2.4649E−06,
A10 = 1.2234E−07

13th surface $\kappa = 0$
A4 = −1.4085E−04, A6 = −6.0043E−06, A8 = 3.8385E−07,
A10 = −1.4605E−08

14th surface $\kappa = 0$
A4 = 5.0254E−04, A6 = −1.7048E−06, A8 = 3.0575E−07,
A10 = −1.2763E−08

20th surface $\kappa = -51.0253$
A4 = 1.3159E−04, A6 = 3.9588E−05, A8 = −3.9795E−06,
A10 = 0.0000E+00

21st surface $\kappa = 0$
A4 = 6.0395E−04, A6 = 2.9117E−05, A8 = −3.8238E−06,
A10 = 2.3728E−08

Zoom data (∞)

| | Wide angle | Intermediate | Telephoto |
|---|---|---|---|
| ω | 40.6 | 23.3 | 12.2 |
| Fno | 3.6 | 4.8 | 5.7 |
| FL | 5.07 | 8.78 | 17.5 |
| d6 | 0.6 | 3.36253 | 6.65076 |
| d11 | 7.0529 | 4.28987 | 1 |
| d12 | 6.88865 | 4.00794 | 0.6 |
| d19 | 2.78614 | 6.27688 | 10.65344 |
| d21 | 4.07164 | 3.46222 | 2.49522 |
| (d26 | 0.04424 | 0.0305 | 0.06359) |

Example 3

| | |
|---|---|
| IHs | 2.42 |
| Lv1Ef | 2.42 |
| Lv1Er | 2.50 |
| Lv1EL | 8.60 |
| L1rEr | 3.00 |
| PEm | 2.90 |
| PEr | 3.00 |
| PEf | 3.40 |

-continued

Unit mm

| | |
|---|---|
| Pe0 | 1.87 |
| Pec | 2.42 |
| PEL | 9.60 |
| fW | 5.07 |
| fT | 17.50 |
| Lv1Er/Lv1EL | 0.291 |
| Lv1Ef/IHs | 1.000 |
| Lv1Ef/Lv1Er | 0.968 |
| L1rEr/PEr | 1.00 |
| Lv1Er/PEr | 0.833 |
| fT/fW | 3.45 |
| EVc − f | −1.1 |

Next, data of a decrease in amount of light in each example is shown below.

Here, EVf is a fall in amount of light at the maximum image height (image position at a lower end of an object) on the front side indicated as an EV value compared to an image center, and EVr is a fall in amount of light at the maximum image height (image position at an upper end of the object) on the rear side indicated as an EV value compared to the image center.

EXAMPLE 1-1

| | EVf | EVr |
|---|---|---|
| Light amount at wide angle end | −1.7 | −1.6 |
| Light amount at intermediate focus state | −0.5 | −0.2 |
| light amount at telephoto end | −0.4 | −0.2 |

EXAMPLE 1-2

| | EVf | EVr |
|---|---|---|
| Light amount at wide angle end | −1.2 | −1.1 |
| Light amount at intermediate focus state | −0.2 | −0.2 |
| light amount at telephoto end | −0.2 | −0.2 |

EXAMPLE 1-3

| | EVf | EVr |
|---|---|---|
| Light amount at wide angle end | −1.3 | −1.3 |
| Light amount at intermediate focus state | −0.2 | −0.2 |
| light amount at telephoto end | −0.2 | −0.2 |

EXAMPLE 2-1

| | EVf | EVr |
|---|---|---|
| Light amount at wide angle end | −0.8 | −0.7 |
| Light amount at intermediate focus state | −0.6 | −0.2 |
| light amount at telephoto end | −0.3 | −0.1 |

EXAMPLE 2-2

|  | EVf | EVr |
|---|---|---|
| Light amount at wide angle end | −0.8 | −0.7 |
| Light amount at intermediate focus state | −0.5 | −0.2 |
| light amount at telephoto end | −0.3 | −0.1 |

EXAMPLE 3

|  | EVf | EVr |
|---|---|---|
| Light amount at wide angle end | −1.1 | −1.1 |
| Light amount at intermediate focus state | −0.4 | −0.2 |
| light amount at telephoto end | −0.3 | −0.2 |

(Digital Camera)

The abovementioned zoom lens can be used in an electronic image capturing apparatus in which, an object image is formed by the abovementioned zoom lens, and an image is captured by receiving the object image by an electronic image pickup element such as a CCD (charge coupled device). An example of an embodiment thereof is given below.

Figure 12:
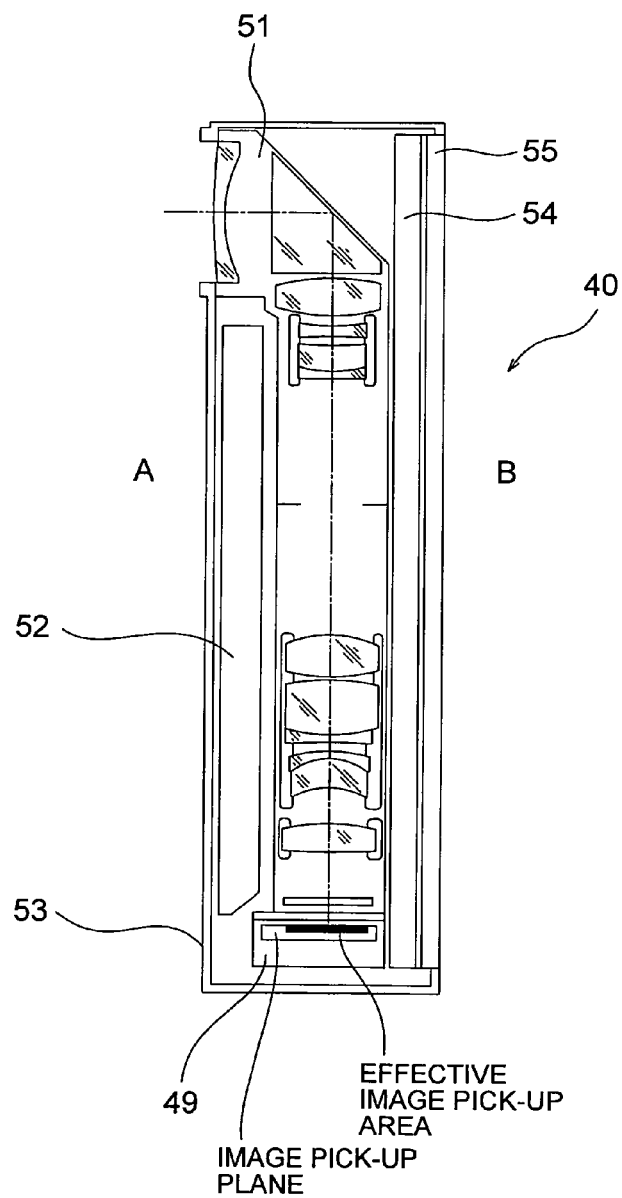
FIG. 12 is schematic cross-sectional structural view of an image pickup apparatus.

FIG. 12 is a schematic cross-sectional structural view of a digital camera 40 which is an image capturing apparatus including an optical path reflecting zoom lens according to the abovementioned examples.

In this case, an arrangement in which, the zoom lens of the first embodiment is used will be described. Each lens unit in the zoom lens is held by a holding frame, and these lens units are accommodated in a lens frame unit 51 in which the lens units are integrated.

An image pickup element 49 is disposed such that a center of an image pickup surface is shifted toward a side of a front surface A of the camera, and is disposed such that an optical axial center of the zoom lens is disposed to be shifted from the center of the image pickup surface.

A damper 52 which is spread over lens units from the second lens unit up to the fourth lens unit and which absorbs any external impact is provided on the side of the front surface A of the lens frame unit 51. A front plate 53 disposed on a front side of a damper 52.

A liquid crystal display element 54 and a cover glass 55 covering the liquid crystal element 54 are disposed to be spread over a rear side of the image pickup element from the first lens unit, on a side of a rear surface B of the lens frame unit 51.

Figure 13A:
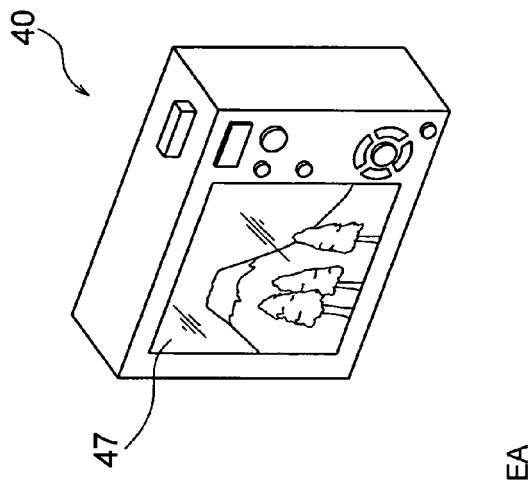
FIG. 13 is an appearance diagram of the image pickup apparatus.
Figure 13B:
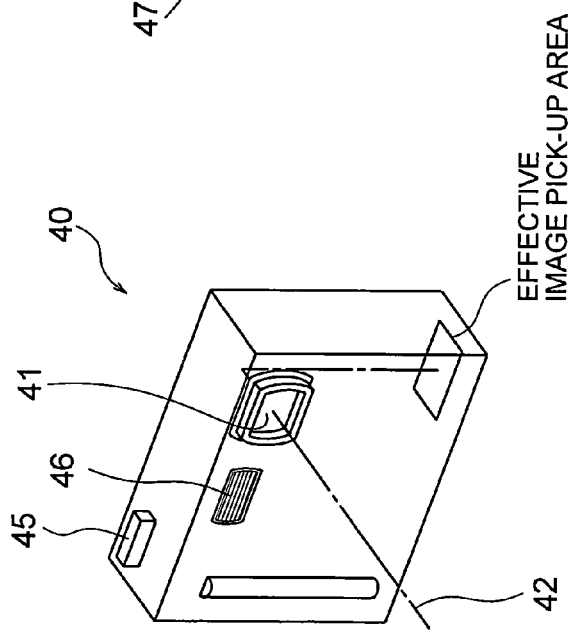

FIG. 13A is a front perspective view showing an appearance of a digital camera 40, FIG. 13B is a rear view of the same. In a case of this example, includes the taking optical system 41 having a taking optical path 42, a shutter button 45, a flash 46, a liquid-crystal display monitor 47. When the shutter button 45 disposed on an upper portion of the digital camera 40 is pressed, in synchronization with the pressing of the shutter button 45, a photograph is taken by the taking optical system 41 such as the zoom lens system in the first embodiment. An object image formed by the taking optical system 41 is formed on an image pickup surface of a CCD 149 (FIG. 14) via a cover glass C and a low pass filter on which a wavelength region restricting coating is applied. An object image which is received as light by the CCD 149 is displayed on the liquid-crystal display monitor 47 which is provided on a rear surface of the digital camera 40 as an electronic image, via a processing means. Moreover, a recording means is connected to the processing means, and it is also possible to record the electronic image which is taken. The recording means may be provided separately from the processing means, or may be formed by recording by writing electronically in a flexible disc, a memory card, or an MO etc. Moreover, the camera may be formed as a silver-salt camera in which a silver-salt film is disposed instead of the CCD 149.

Since the digital camera 40 structured in such manner has the taking optical system 41 according to the present invention, has an extremely small thickness in collapsed state, and an extremely stable imaging performance in the entire zooming region at high magnification, it is possible to realize a high-performance, a small size, and a widening of angle of field.

(Internal Circuit Structure)

Figure 14:
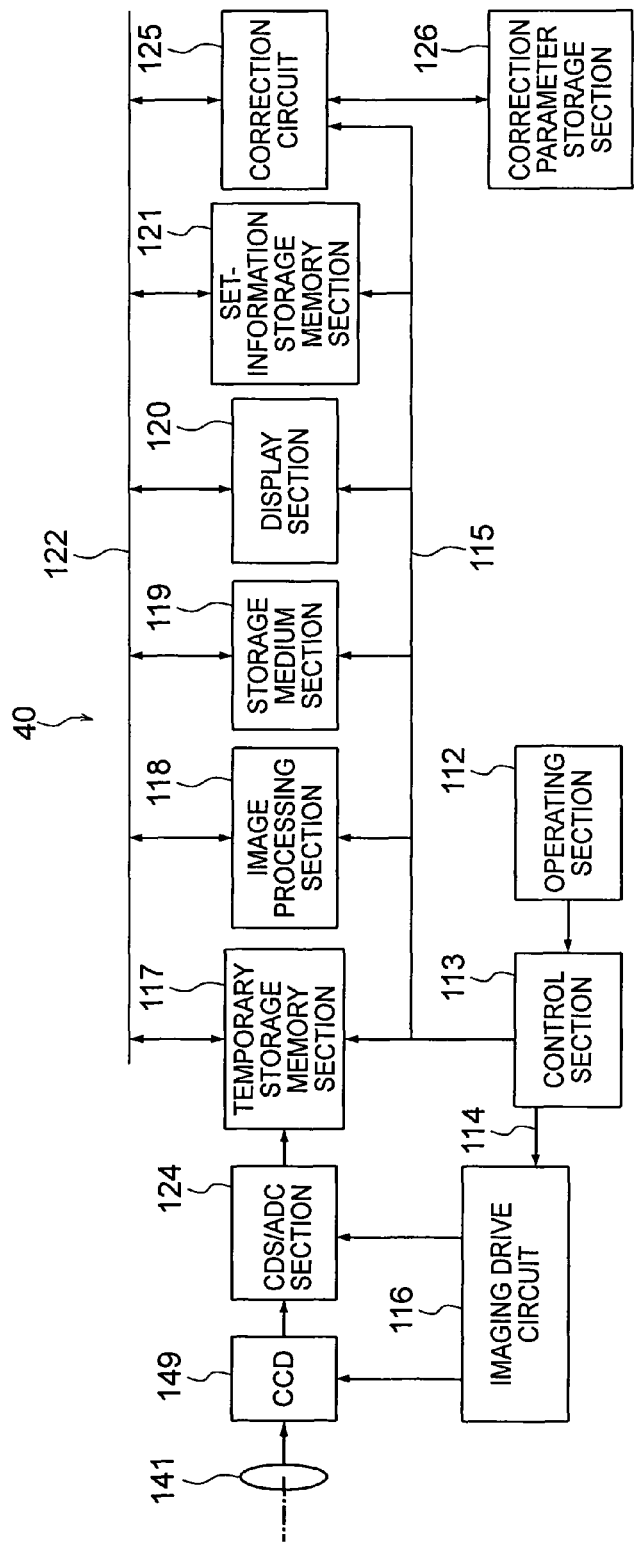
FIG. 14 is a circuit diagram of the image pickup apparatus.

FIG. 14 is a structural block diagram of an internal circuit of main components of the digital camera 40. In the following description, the processing means described above includes for instance, a CDS/ADC section 124, a temporary storage memory 117, and an image processing section 118, and a storage means consists of a storage medium section 119 for example.

As shown in FIG. 14, the digital camera 40 includes an operating section 112, a control section 113 which is connected to the operating section 112, the temporary storage memory 117 and an imaging drive circuit 116 which are connected to a control-signal output port of the control section 113, via a bus 114 and a bus 115, the image processing section 118, the storage medium section 119, a display section 120, and a set-information storage memory section 121.

The temporary storage memory 117, the image processing section 118, the storage medium section 119, the display section 120, and the set-information storage memory section 121 are structured to be capable of mutually inputting and outputting data via a bus 122. Moreover, the CCD 149 and the CDS/ADC section 124 are connected to the imaging drive circuit 116.

The operating section 112 includes various input buttons and switches, and is a circuit which informs the control section, event information which is input from outside (by a user of the digital camera) via these input buttons and switches.

The control section 113 is a central processing unit (CPU), and has a built-in computer program memory which is not shown in the diagram. The control section 113 is a circuit which controls the entire digital camera 40 upon receiving instructions and commands input by the user of the camera via the operating section 112, according to a computer program stored in this computer program memory.

The CCD 149 receives as light an object image which is formed via the taking optical system 141 according to the present invention. The CCD 149 is an image pickup element which is driven and controlled by the imaging drive circuit 116, and which converts an amount of light for each pixel of the object image to an electric signal, and outputs to the CDS/ADC section 124.

The CDS/ADC section 124 is a circuit which amplifies the electric signal which is input from the CCD 149, and carries out analog/digital conversion, and outputs to the temporary storage memory 117 image raw data (bare data, hereinafter called as 'RAW data') which is only amplified and converted to digital data.

The temporary storage memory 117 is a buffer which includes an SDRAM (Synchronous Dynamic Random Access Memory) for example, and is a memory device which stores temporarily the RAW data which is output from the CDS/ADC section 124. The image processing section 118 is a circuit which reads the RAW data stored in the temporary storage memory 117, or the RAW data stored in the storage medium section 119, and carries out electrically various image-processing including the distortion correction, based on image-quality parameters specified by the control section 113.

The storage medium section 119 is a recording medium in the form of a card or a stick including a flash memory for instance, detachably mounted. The storage medium section 119 is a control circuit of a device in which, the RAW data transferred from the temporary storage memory 117 and image data subjected to image processing in the image processing section 118 are recorded and maintained in the card flash memory and the stick flash memory.

The display section 120 includes the liquid-crystal display monitor, and is a circuit which displays images and operation menu on the liquid-crystal display monitor. The set-information storage memory section 121 includes a ROM section in which various image quality parameters are stored in advance, and a RAM section which stores image quality parameters which are selected by an input operation on the operating section 112, from among the image quality parameters which are read from the ROM section. The set-information storage memory section 121 is a circuit which controls an input to and an output from the memories.

The digital camera 40 structured in such manner has the taking optical system 41, according to the present invention, which, while having a sufficient wide angle region, and a compact structure, has an extremely stable imaging performance in the entire magnification region at a high magnification. Therefore, it is possible to realize the high performance, the small size, and widening of the angle. Moreover, a prompt focusing operation at the wide angle side and the telephoto side is possible.

A correction circuit 125 which corrects electrically an image picked up by an image pickup element (CCD) 149 is provided. The correction circuit 125 has a correction-parameter storage unit 126 which holds parameters for correcting brightness differing at the front side and the rear side of a center of an image for correcting a rate of decrease in an asymmetric brightness of a front side and a rear side of the zoom lens. Accordingly, it is possible to correct by signal processing, an exposure difference at the front side and the rear side which is due to vignetting of light beam, and it is possible to achieve a favorable image.

Furthermore, the correction-parameter storage unit 126 holds correction parameters which differ for the front side and the rear side corresponding to each state, taking into consideration an asymmetric exposure difference which varies according to zooming of the zoom lens and a change in an area of opening of the aperture stop.

Accordingly, it is preferable to correct according to the asymmetric exposure difference which varies according to the state of the zoom lens.

Apart from this, in order to correct an asymmetric image change which is due to asymmetric vignetting, it is preferable to correct by image processing, a difference in a depth of field in a surrounding portion, a difference in an image distortion, and a difference in shading.

Moreover, it is preferable to carry out correction in which, vignetting has been taken into consideration according to a photometric area or a focusing area.

Moreover, it is preferable to make an arrangement such that an image processing is carried out in advance to reduce an effect due to asymmetry of vignetting, and thereafter, image conversion of a filter effect due to image processing is carried out.

As it has been described above, the present invention is useful in an optical-path bending camera.

According to the present invention, there can be provided an image pickup apparatus which includes an optical path reflecting zoom lens, which is advantageous for slimming.

What is claimed is:

1. An image pickup apparatus comprising:
a zoom lens; and
an image pickup element having an image pickup surface which receives optically an image formed by the zoom lens, and which converts the image received to an electric signal, wherein
the zoom lens comprises
an object-side lens unit comprising a prism having a reflecting surface which reflects an optical path, and an object-side sub lens unit having a negative refracting power which is disposed on an object side of the prism,
an aperture stop which is disposed on an image side of the object-side lens unit, and which restricts an axial light beam, and
a first zooming lens unit having a positive refracting power, which is disposed on the image side of the aperture stop, and which is moved to be closer to the aperture stop at a telephoto end rather than the wide angle end for carrying out zooming, and
the object-side lens unit is at a position which is fixed at the time of zooming from the wide angle end to the telephoto end, and is a lens unit which is disposed nearest to the object side, and
when a surface including an incident-light axis of light which is incident on the reflecting surface, and a reflected-light axis of light which is reflected at the reflecting surface is let to be a reference surface, and
a side at which the incident-light axis is with respect to the reflected-light axis is let to be a front side, and
a side opposite to the front side with respect to an optical axis of light after reflection is let to be a rear side, and
the image pickup element has an effective image pickup area having a rectangular shape with a short side and a long side, and
the short side of the effective image pickup area is parallel to the reference surface, and
the first zooming lens unit comprises
an object-side lens which is disposed nearest to the aperture stop in the first zooming lens unit, and
the object-side lens in the first zooming lens unit has a noncircular outer shape with a part of the front side and the rear side cut out, and
in the object-side lens in the first zooming lens unit, an outer size in a direction from the optical axis to the front side is smaller than an outer size in a direction from the optical axis to the rear side, and
the object-side lens in the first zooming lens unit has an object-side lens surface which satisfies the following conditional expressions (1), (2), and (3)

$$Lv1\,Er/Lv1\,EL<0.49 \tag{1}$$

$$0.93<Lv1\,Ef/IHs \tag{2}$$

$$Lv1\,Ef/Lv1\,Er<0.99 \tag{3}$$

where,
- Lv 1 Er denotes a length of an area of the rear side measured from the optical axis along the reference surface, in an effective area of the object-side lens surface of the object-side lens in the first zooming lens unit,
- Lv 1 EL denotes a length of an area measured along a direction perpendicular to the reference surface including the optical axis, in the effective area of the object-side lens surface of the object-side lens in the first zooming lens unit,
- Lv 1 Ef denotes a length of an area of the front side measured from the optical axis along the reference surface, in the effective area of the object-side lens surface of the object-side lens in the first zooming lens unit, and
- IHs denotes the maximum image height in a direction along the reference surface in the effective image pickup area.

2. The image pickup apparatus according to claim 1, wherein the prism has an outer shape with a part of the rear side cut out.

3. The image pickup apparatus according to claim 2, wherein
the object-side lens unit comprises an image-side sub lens unit having a positive refracting power which is disposed on an image side of the prism, and
each of the prism and the image-side sub lens unit has an outer shape with a part of the rear side cut out.

4. The image pickup apparatus according to claim 3, wherein the image pickup apparatus satisfies the following conditional expression (6)

$$0.90 < L1\ r\ Er/PEr < 1.1 \tag{6}$$

where,
- L1 r Er denotes a length of an area of the rear side measured from the optical axis along the reference surface, in an effective area of the object-side lens surface of the image-side sub lens unit in the object-side lens unit, and
- PEr denotes the length of the area of the rear side measured from the optical axis along the exit surface, in the effective area of the emergence surface of the prism in the object-side lens unit.

5. The image pickup apparatus according to claim 1, wherein the image pickup apparatus satisfies the following conditional expression (4-1)

$$PeO < PEr < PEf \tag{4-1}$$

where,
- PEr denotes a length of an area of the rear side measured from the optical axis along the reference surface, in an effective area of an exit surface of the prism in the object-side lens unit,
- PeO denotes a length from an optical axis of a light ray which passes through a position nearest to the optical axis at the exit surface of the prism, from among light rays which are incident at the maximum image height of the front side on the reference surface, at the wide angle end, and
- PEf denotes a length of an area of the front side measured along the reference surface from the optical axis in the effective area of the exit surface of the prism in the object-side lens unit.

6. The image pickup apparatus according to claim 5, wherein the image pickup apparatus satisfies the following conditional expression (4-2)

$$Pec \leq PEr \tag{4-2}$$

where,
- PEr denotes a length of an area of the rear side measured along the reference surface from the optical axis in the effective area of the exit surface of the prism in the object-side lens unit, and
- Pec denotes a length from the optical axis to a position through which a chief ray which is incident at the maximum image height of the front side on the reference surface passes on the exit surface of the prism, at the wide angle end.

7. The image pickup apparatus according to claim 5, wherein the image pickup apparatus satisfies the following conditional expression (4-3)

$$Pem \leq PEr \tag{4-3}$$

where,
- PEr denotes a length of an area of the rear side measured along the reference surface from the optical axis in the effective area of the exit surface of the prism in the object-side lens unit, and
- Pem denotes a length of an area of the front side measured along the reference surface from the optical axis in the effective area of the exit surface of the prism at the wide angle end.

8. The image pickup apparatus according to claim 1, wherein
the image-side sub lens unit in the object-side lens unit has a noncircular outer shape with a part of the front side and the rear side cut out, and
in the image-side sub lens unit in the object-side lens unit, an outer side in the direction from the optical axis to the front side is larger than an outer size in the direction from the optical axis to the rear side.

9. The image pickup apparatus according to claim 1, wherein the object-side lens in the first zooming lens unit has an object-side lens surface which satisfies the following conditional expression (7)

$$0.70 < Lv\ 1\ Er/PEr < 0.98 \tag{7}$$

where,
- PEr denotes the length of the area of the rear side measured from the optical axis along the reference surface in the effective area of the exit surface of the prism in the object-side lens unit, and
- Lv 1 Er denotes the length of the area of the rear side measured from the optical axis along the reference surface, in the effective area of the object-side lens surface of the object-side lens in the first zooming lens unit.

10. The image pickup apparatus according to claim 1, wherein
the object-side lens unit has a positive refracting power, and
the zoom lens comprises a second zooming lens unit having a negative refracting power, which is disposed between the object-side lens unit and the aperture stop, and which is moved to be closer to the aperture stop at the telephoto end rather than the wide angle end for carrying out zooming, and a lens unit having a positive refracting power which is disposed on the image side of the first zooming lens unit, and
no other lens unit is provided between the second zooming lens unit and the first zooming lens unit.

11. The image pickup apparatus according to claim 10, wherein the first zooming lens unit comprises a plurality of positive lens components having an object-side surface which is a convex surface, which are disposed side-by-side on the object side, and a negative lens component having an image-side surface which is a concave surface, which is disposed on an image side of the plurality of positive lens components.

12. The image pickup apparatus according to claim 1, wherein the zoom lens satisfies the following conditional expression (8)

$$3.4 < fT/fW \tag{8}$$

where, fT denotes a focal length of the zoom lens at the telephoto end, and fW denotes a focal length of the zoom lens at the wide angle end.

13. The image pickup apparatus according to claim 1, wherein the zoom lens satisfies the following conditional expression (8-1)

$$50° > \omega W > 38.0° \tag{8-1}$$

where,

ω denotes the maximum half angle of field of the zoom lens at the wide angle end.

14. The image pickup apparatus according to claim 1, further comprising:

a display monitor which is disposed on the rear side of the zoom lens, wherein a center of an image pickup surface of the image pickup element is positioned on a front side with respect to a center of the effective image pickup area.

15. The image pickup apparatus according to claim 1, further comprising:

a correction circuit which corrects electrically an image which has been picked up by the image pickup element, wherein the correction circuit has a correction-parameter storage unit which holds parameters for correcting brightness differing at the front side and the rear side of a center of an image for correcting a rate of decrease in an asymmetric brightness of the front side and the rear side of the zoom lens.

16. The image pickup apparatus according to claim 15, wherein the correction-parameter storage unit has correction parameters which differ for the front side and the rear side corresponding to each state of an asymmetric exposure difference which varies according to zooming of the zoom lens and a change in an area of an opening of the aperture stop.

17. The image pickup apparatus according to claim 1, wherein the zoom lens satisfies the following conditional expression (9) when the aperture stop is open at the wide angle end $$-3.5 < EV_{c\text{-}f} < -0.7 \tag{9}$$

where, $EV_{c\text{-}f}$ denotes a value obtained by subtracting an EV value at the maximum image height of the front side along the reference surface at the wide angle end from an EV value on an axis at the wide angle end.

* * * * *